United States Patent [19]

Simpson et al.

[11] 3,886,086
[45] May 27, 1975

[54] METHOD OF PRODUCING GEL SPHERES AND GELATION APPARATUS

[75] Inventors: Malcolm Patrick Simpson, Didcot; Claude Lewis Stockwell, Newbury, both of England

[73] Assignee: United Kingdom Atomic Energy Authority, London, England

[22] Filed: June 12, 1972

[21] Appl. No.: 261,958

[30] Foreign Application Priority Data
June 24, 1971 United Kingdom............ 29781/71

[52] U.S. Cl......... 252/317; 23/288 A; 252/301.1 S; 252/359 R; 252/448; 264/.5
[51] Int. Cl.............................................. B01j 13/00
[58] Field of Search . 252/317, 359 R, 448, 301.1 S; 264/.5; 23/288 A

[56] References Cited
UNITED STATES PATENTS

| | | | |
|---|---|---|---|
| 2,450,394 | 9/1948 | Brown | 252/448 |
| 2,492,808 | 12/1949 | Marisic et al. | 252/317 X |
| 3,463,842 | 8/1969 | Flack et al. | 252/301.1 S X |
| 3,558,508 | 1/1971 | Keith et al. | 252/317 |

*Primary Examiner*—Richard D. Lovering
*Attorney, Agent, or Firm*—Larson, Taylor and Hinds

[57] ABSTRACT

In certain gelation processes the gelling of liquid droplets to produce gel spheres is achieved by allowing the droplets to fall into a liquid reagent which acts to gel the droplets.

According to the present invention a foam layer is provided above the surface of the liquid reagent so as to inhibit the droplets from contacting the surface of the liquid reagent at a velocity sufficient to disrupt or substantially distort the droplets. Gelation apparatus for conducting the process is also disclosed, said apparatus having a column vertically divided by a baffle into a turbulent bubble region, and a substantially quiescent region through which the droplets fall after the partially gelled droplets have previously passed through the foam layer.

4 Claims, 1 Drawing Figure

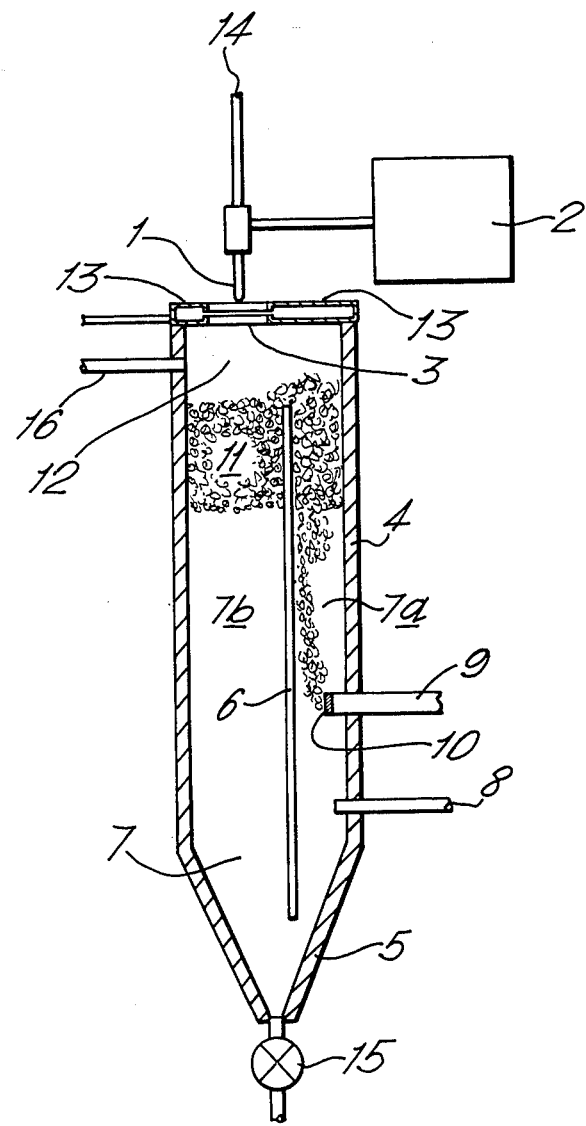

METHOD OF PRODUCING GEL SPHERES AND GELATION APPARATUS

This invention relates to gelation apparatus and particularly to apparatus and methods for forming gel spheres.

Gel spheres are produced in gelatin processes by contacting the feed material, in the form of droplets, with a gelling reagent so that the droplets are caused to gel in a generally spherical shape.

Processes for producing gel spheres in this manner find application in the production of nuclear fuels and also in other fields, for example, certain ceramic techniques.

In gelation processes in which the droplets are required, by virtue of the process design, to pass through a gaseous reagent region, in which the gelation reaction begins, and then contact the surface of a liquid reagent in another region, in which the gelation reaction continues to completion, the disadvantage exists that malformed gel products may be produced if the droplets, partially gelled in the gaseous reagent region, are not sufficiently hard to be capable of passing from one region to the other without substantial deformation.

It is therefore one object of the present invention to provide an improved gelation apparatus that may be used to substantially overcome the foregoing disadvantage.

Another object of the present invention is to provide a method of producing gel spheres that substantially avoids the above-mentioned disadvantage.

According to one aspect of the present invention, in a gelation apparatus comprising a column and means for introducing droplets of the material to be gelled into the column, said column having an upper part to provide a gaseous region and a lower part to provide a liquid reagent region, means are provided for preventing the droplets from contacting the surface of the liquid reagent at a velocity sufficient to disrupt or substantially distort the droplets.

According to another aspect of the present invention a method of producing gel spheres comprises introducing droplets of the material to be gelled into a column, causing the droplets to make contact with a gaseous reagent in a region at an upper part of the column, subjecting the droplets to the influence of a means for retarding the fall of the droplets passing down the column so that the droplets are not disrupted or substantially distorted on contacting the surface of a liquid reagent in a lower part of the column, and causing the droplets to contact the liquid reagent in a region at the lower part of the column.

In a preferred embodiment of the present invention, the means for retarding the fall of the droplets takes the form of a layer of foam above the surface of the liquid reagent.

In order that the invention may be clearly understood, one example, in accordance with the invention, will now be described with reference to the drawing, which is a diagrammatic representation of a gelation apparatus for which one application is the production of nuclear fuel particles. In this example both the gaseous region and the liquid reagent region contain gelling reagents.

Referring now to the drawing, the apparatus comprises a jet arrangement 1 (a single jet is shown but a plurality may be used) which is connected to an electromagnetic vibrator 2, the vibrations of which may be controlled with regard to frequency and amplitude so as to produce droplets of the desired size.

The jet arrangement 1, thus connected, is positioned over an aperture 3 which provides access to a cylindrical column 4 having a conical lower section 5.

Mounted in column 4 is a baffle member 6 extending across the column 4 in the vertical plane and of sufficient vertical length to extend well below and above the operational level of the surface of liquid reagent 7, which contains a surfactant and is introduced into column 4 by means of liquid reagent inlet 8.

Gaseous reagent is introduced via inlets 9 and 16. Inlet 9 is positioned so as to be below the operational level of the surface of liquid reagent 7 and is terminated within the column 4 with a perforated member 10 providing a multiplicity of small holes. Inlet 16 is arranged to be in communication with region 12.

In operation, gaseous reagent is passed into the column 4 via inlet 9 and perforated member 10 to emerge as a multiplicity of bubbles on the inlet 9 side of the baffle member 6, that is in region 7a. The bubbling of the gaseous reagent through the surfactant-containing liquid reagent 7 results in the formation of a layer of foam above the surface of liquid reagent 7 in region 7a, which foam, when sufficiently developed, flows over the top edge of the baffle member 6 to form a layer of foam on the opposite side of the baffle member 6 in region 11.

Gaseous reagent escaping from the foam tends to fill region 12, this is supplemented by gaseous reagent introduced through inlet 16 to provide a gaseous reagent region. Inlet 16 is arranged to introduce gaseous reagent above the level of the foam in region 11. Excess gaseous reagent is removed via a gas withdrawal system represented at 13 which inhibits the escape of gaseous reagent from the top of the column 4 so as to prevent premature gelling of the liquid feed material before the droplets have assumed a spherical shape, and also to prevent the blocking of the jet arrangement 1 by the gelling of liquid feed material prior to its leaving jet arrangement 1.

Liquid feed material to be formed into droplets and then reacted with reagents to produce particles is fed to the vibrating jet arrangement 1 through tube 14, and the so formed droplets fall into the column 4 through aperture 3. The jet arrangement 1 is positioned sufficiently far away from the aperture 3 to ensure that the droplets have time to assume a spherical shape before entering the gelling reagent regions. The droplets react with the gaseous reagent in region 12 to produce partially gelled droplets which then fall into the foam in region 11 in which the fall of the droplets is retarded to the point where the droplets may contact the surface of the liquid reagent 7 without disruption or substantial distortion. The droplets then fall through the liquid region 7b, which is a substantially quiescent region, being separated from the more turbulent bubble region 7a by baffle member 6, so that the gelling droplets are not subjected to very turbulent conditions. The gelled spheres may be withdrawn from a lower region of the column by a suitable valve and pipe arrangement represented at 15.

It should be appreciated that the foam layer is not a 'static' one since it is being continuously regenerated and moves into region 11 via the weir provided by the uppermost edge of baffle member 6. The weir arrangement and the rate of gaseous reagent inflow controls the level and extent of the foam layer formed.

An example of the nuclear fuels which may be produced by using the above apparatus is uranium oxide. In this case a suitable jet arrangement is laterally vibrated at 60 cycles per second or a multiple thereof and the liquid feed material fed to this jet arrangement may be uranium nitrate solution, containing suitable additives, supplied at a flow rate of 1 ml/sec; the gaseous reagent is then desirably ammonia and the liquid reagent is ammonium hydroxide.

It will be appreciated, however, that the gaseous and liquid reagents may be varied to suit the requirements of a particular application, and thus the invention is not confined to those given in the above example. Also, the quoted example of a foam layer is not the only means of reducing the relative velocity between the gelling spheres and the liquid reagent.

We claim:

1. A method of producing gel spheres comprising introducing droplets of material to be gelled into a column, causing the droplets to make contact with a gaseous reagent in a region at an upper part of the column, and causing the droplets to contact a liquid reagent in a region at a lower part of the column, the fall of the droplets passing down the upper part of the column being retarded by a layer of foam provided above the surface of the liquid reagent in the lower part of the column such that the droplets are not disrupted or substantially distorted on contacting the surface of the liquid reagent in the lower part of the column.

2. A method as claimed in claim 1 wherein the layer of foam is generated by bubbling gaseous reagent through liquid reagent containing a non-ionic surfactant.

3. A method as claimed in claim 1 wherein the droplets fall into a quiescent region in the column separated from that region of the column wherein the foam is generated.

4. A gelation apparatus for the production of gel spheres by the gelling of droplets of a liquid, comprising a jet arrangement, means for supplying a liquid to be gelled to the jet arrangement, means for vibrating the jet arrangement to form the liquid into droplets, a column below the jet arrangement and having an upper part adapted to contain a gaseous reagent and a lower part to contain a liquid reagent, droplets of the liquid being arranged to pass from the jet arrangement into the column to be gelled therein, a baffle vertically dividing the column, means for inhibiting the escape of gaseous reagent from the top of the column and means for bubbling a gas through the liquid reagent in order to produce a layer of foam above the surface of the liquid reagent to prevent the droplets from contacting the surface of the liquid reagent at a velocity sufficient to disrupt or substantially distort the droplets, the arrangement being such that the droplets will pass on one side of the baffle, the bubbles of gas will pass on the other side of the baffle and foam will pass over the top of the baffle.

* * * * *